United States Patent [19]

Cheshier et al.

[11] Patent Number: 4,478,435
[45] Date of Patent: Oct. 23, 1984

[54] SWIVEL CONNECTOR

[76] Inventors: Charles L. Cheshier, 7514 Cottonwood Ct., Garland, Tex. 75042; Don W. Lewis, 200 Lynge, Allen, Tex. 75002

[21] Appl. No.: 439,396

[22] Filed: Nov. 5, 1982

[51] Int. Cl.³ .............................................. F16L 35/00
[52] U.S. Cl. ..................................... 285/39; 285/98; 285/168; 285/281; 285/351; 285/DIG. 19
[58] Field of Search .............. 285/281, 278, 280, 168, 285/98, 351, DIG. 19, 181, 39

[56] References Cited

U.S. PATENT DOCUMENTS

| | | | |
|---|---|---|---|
| 3,011,803 | 12/1961 | Buckner et al. | 285/98 X |
| 3,265,087 | 8/1966 | Livingston | 285/168 X |
| 3,517,952 | 6/1970 | McCracken | 285/276 |
| 3,880,120 | 4/1975 | Shulick | 285/281 X |
| 3,900,221 | 8/1975 | Fouts | 285/168 X |
| 4,055,359 | 10/1977 | McWethy | 285/351 X |
| 4,079,969 | 3/1978 | Wilson et al. | 285/276 |
| 4,229,024 | 10/1980 | Oberrecht et al. | 285/98 |

*Primary Examiner*—Dave W. Arola
*Attorney, Agent, or Firm*—Kanz, Scherback & Timmons

[57] ABSTRACT

Swivel connector apparatus for use in connecting lines together which carry a pressurized fluid and which require relative rotation therebetween is disclosed which includes an outer body having a bore formed axially therein which extends entirely therethrough. An inner body is configured for an interfitting relationship between a first portion thereof and the bore of the outer body which includes three bore portions. The inner body includes a bore formed axially therein which extends entirely therethrough. The first portion of the inner body is provided with a predetermined number of annular cavities on the outer surface at predetermined locations. Sealing means and radial bearing means are positioned in predetermined annular cavities of the first portion of the inner body and are in engagement with the first portion of the inner body and the bore of the outer body. A retaining nut and a one-piece combined radial and axial bearing are positioned on the first portion of the inner body at a predetermined location and are maintained at that location by retaining means. The combined radial and axial bearing is in engagement with the inner body, the outer body and the retaining nut. Threads in the retaining nut cooperate with threads on the outer body to maintain the inner and outer bodies in operative rotatable relationship.

22 Claims, 4 Drawing Figures

SWIVEL CONNECTOR

DESCRIPTION

Technical Field

The present invention relates in general to fluid lines or the like, and more particularly to connector apparatus which permits relative rotation between two parts of a fluid line while passing a pressurized fluid therethrough.

Although the present invention is applicable for connecting various lines together which require relative movement therebetween, it has been found to be particularly useful in the coin-operated car wash operations where the car is washed by the car owner while the car is parked in an appropriate stall. Therefore, without limiting the applicability of the invention to "car washes" the invention will be described in this environment.

When connecting pressurized fluid lines together which require relative rotation or movement between the lines, means must be provided which allows the relative rotation while maintaining a tight seal between the lines to prevent any leakage of the liquid or gas contained in the lines. In some installations, the connecting means must be capable of withstanding any effects of corrosive material which might, by design or otherwise, be introduced into the fluid lines without affecting the functional performance of the connecting means. Also, in many installations, the connecting means must be capable of withstanding radial as well as axial forces.

Background Art

Various types and configurations of swivel unions, fittings or joints have been widely used in a variety of applications. The swivel unions, fittings or joints vary in the degree of complexity and the number of parts, the type and effectiveness of bearings, the type and effectiveness of seals, etc. For example, U.S. Pat. No. 1,436,392 discloses a swivel union which includes a main coupling member and a companion coupling member which are joined together by a coupling nut having internal threads. The companion coupling member includes a tube or barrel which extends within the interior of the main coupling member and holds rope-like packing material which is wrapped therearound. A packing retaining member assists in compressing the packing material to form a seal within the union.

U.S. Pat. No. 2,421,974 discloses a swivel fitting which includes an inner sleeve having an enlarged portion at one end and a flared portion at the other end. An attaching nut, a sleeve nut and a bearing means are captured in a rotating relationship around the inner sleeve. The sleeve nut is threadably attachable to an outer sleeve which abuts the enlarged portion of the inner sleeve. Sealings means is positioned across the discontinuity between the outer sleeve and the enlarged portion of the inner sleeve.

U.S. Pat. No. 3,011,803 discloses a swivel conduit joint which includes an outer passage body and an inner passage body that is telescoped in and journaled in the outer passage body. The outer passage body and the inner passage body cooperate to form an annular space around the inner passage body which is divided into a bearing space and a sealing space. The bearing space is occupied by a bearing assembly including a series of steel balls, bearing rings, a sleeve and a spacer. The sealing space is occupied by two sealing rings of different shape.

U.S. Pat. No. 3,517,952 discloses a swivel joint which includes a female body containing a bore which receives a male body having an annular cavity in the surface thereof. A fluid seal is disposed in said annular cavity. A ball bearing assembly is also positioned between the inner and outer bodies and is held in place by a snap ring. A thermoplastic end cap acts as a dust seal.

U.S. Pat. No. 4,079,969 discloses a swivel connector which includes a first body and a second body rotatably connected to each other with an enlarged portion of the first body overlapping a reduced portion of the second body. The reduced portion of the second body includes six different levels or degrees of reduction spaced along its length which support various bearings and seals. The first and second bodies are held together by two set screws.

The present invention as claimed is intended to provided a solution to various prior art deficiencies including the need to disconnect the swivel fitting from its in-line position before it is possible to disassemble the fitting for repair. Also, many prior art devices are difficult to disassemble and repair and are expensive because of the many different parts comprising the device. Also, some prior art devices tend to corrode when coming in contact with certain materials. Many of the repair kits for the prior art devices are expensive and difficult to install without damaging the seals since the seals can not be observed during the assembling of the parts of the device. Some prior art devices require special tools to accomplish the disassembly, repair and assembly of the device. In many prior art devices, reliability is below an acceptable level as a result of the complexity of the device.

DISCLOSURE OF THE INVENTION

The present invention provides a swivel connector apparatus for use in connecting lines together which carry a pressurized fluid and which require relative rotation therebetween. The apparatus includes a female or outer body having a bore or passage formed axially therein which extends entirely therethrough. One end of a first portion of the female or outer body is configured to be capable of attachment to a first pipe or line. The apparatus further includes a male or inner body for an interfitting relationship between a first portion thereof and the bore or passage of the female or outer body. The male or inner body includes a bore or passage formed axially therein which extends entirely therethrough. The first portion of the male or inner body is provided with a predetermined number of annular cavities on the outer surface at predetermined locations or positions. Some of the annular cavities hold sealing means in the form of O-rings while one annular cavity holes a bearing means to resist radial forces exerted on the female and male bodies. A retaining nut together with a radial and axial bearing is positioned on the first portion of the male or inner body at a predetermined location and are maintained at that location by retaining means. Threads in the retaining nut cooperate with threads on the female or outer body to maintain female body and male body in operative rotatable relationship. One end of a second portion of the male body is configured to be capable of attachment to a second pipe or line.

Among the advantages offered by the present invention is a less complicated design of greater reliability with a fewer number of parts. Another advantage is that the present invention is more economical to manufacture. The present invention is designed and arranged so as to provide a tight swivel connector which resists both axial and radial forces without leaking or damaging the sealing means. If repairs are necessary, the design permits easy disassembly of the connector without the need to disconnect the connector from the entrance or exit lines to replace any sealing or bearing means. Special tools are not required in the disassembly, repair and assembly of the inventive connector.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements in which:

BEST MODE FOR CARRYING OUT THE INVENTION

Figure 1:
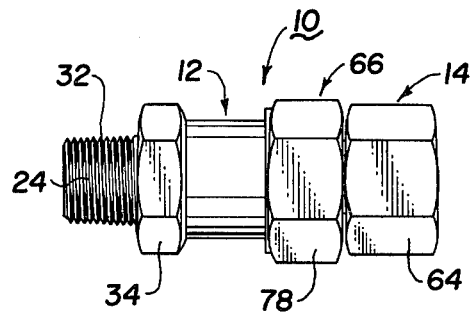
FIG. 1 is a simplified side elevational view of the swivel connector according to the present invention.
Figure 2:
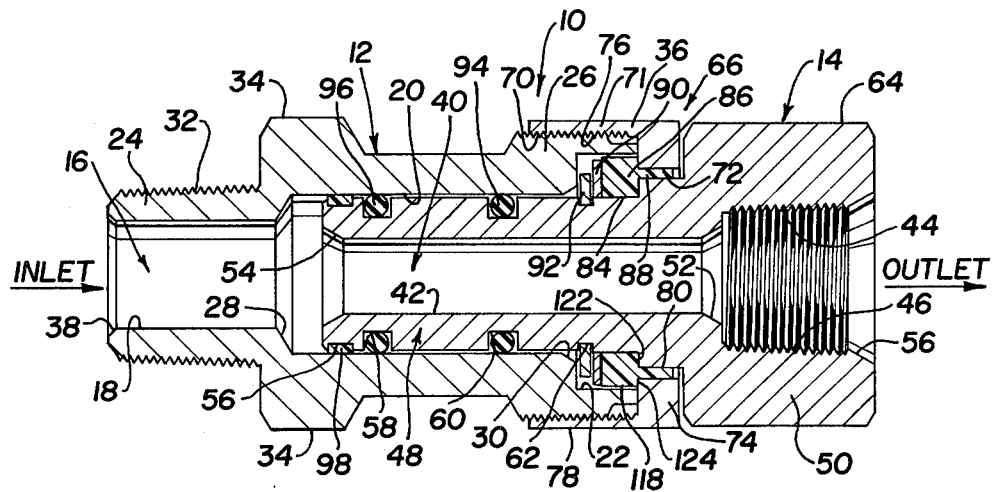
FIG. 2 is a simplified longitudinal sectional view through the swivel connector according to the present invention.
Figures 3, 4:
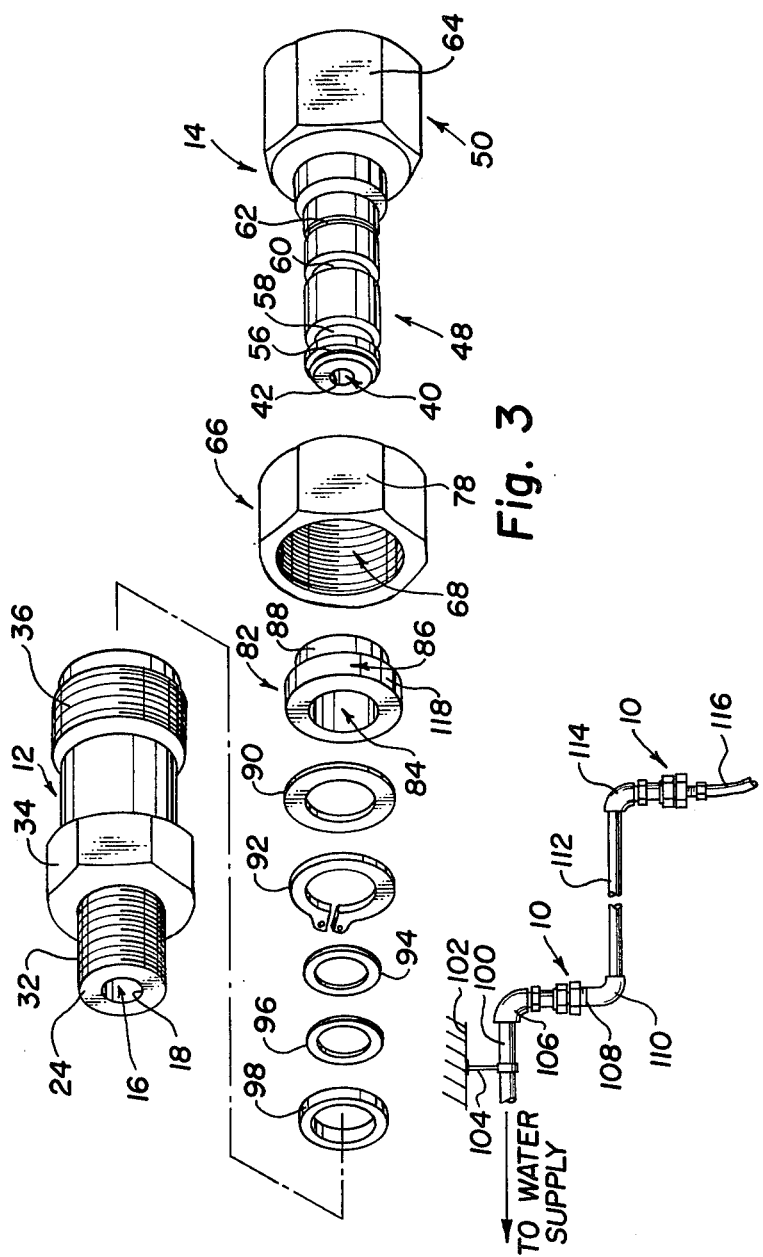
FIG. 3 is a simplified exploded perspective view of the swivel connector according to the present invention.
FIG. 4 is a simplified schematic representation showing the use of the present invention as installed inline at a typical car wash operation.

Referring now to the drawing, and in particular, to FIGS. 1-3, swivel connector apparatus according to the present invention, is generally referred to by reference numeral 10. The swivel connector apparatus 10 comprises a one-piece female or outer body 12 and a one-piece male or inner body 14 which are positioned in an interfitting relationship. More particularly, female or outer body 12 has a bore or passage 16 formed axially therein which extends entirely therethrough. Bore or passage 16 comprises three bore portions as at first bore portion 18, second bore portion 20 and third bore portion 22. In the disclosed embodiment, first bore portion 18 is of a first predetermined diameter and extends a first predetermined distance into said female or outer body 12 from one end of first portion 24 thereof. In the disclosed embodiment, second bore portion 20 is of a second predetermined diameter and extends a second predetermined distance into said female or outer body 12 but from one end of a second portion 26 thereof. Second bore portion 20 is coaxial with first bore portion 18 but is larger in diameter and longer in length than first bore portion 18. In the disclosed embodiment, third bore portion 22 is of a third predetermined diameter and extends a third predetermined distance into said female or outer body 12 from the end of second portion 26 thereof. Third bore portion 22 is coaxial with said first and second bore portions 18 and 20, respectively, but is larger in diameter and shorter in length than either first or second bore portions 18 and 20. The surfaces of adjacent ends of first and second bore portions 18 and 20 are connected by first beveled surface or wall 28. The surfaces of adjacent ends of second and third bore portions 20 and 22 are connected by second beveled surface or wall 30.

The outer surface, periphery or extremity of first portion 24 of female or outer body 12 is threaded as shown at threads 32. In the disclosed embodiment, two versions have been made for the car wash operations with threads 32 being either ¼ inch NPT pipe thread or ⅜ inch NPT pipe thread. Threads 32 are not limited to those two configurations. The outer surface of female or outer body 12, for a predetermined distance just inboard of threads 32, is provided with wrench-engageable portions 34 illustrated in the present drawing as being of the conventional hexagonal form. The outer surface, periphery or extremity of one end of second portion 26 is threaded as shown at threads 36. Third beveled surface 38 is positioned at the inlet end of first bore portion 18.

Male or inner body 14 has a bore or passage 40 formed axially therein which extends entirely therethrough. Bore or passage 40 comprises two bore portions as at fourth bore portion 42 and fifth bore portion 44. In the disclosed embodiment, fourth bore portion 42 is of a fourth predetermined diameter and extends a fourth predetermined distance into said male or inner body 14 from one end of a first portion 48 thereof. In the disclosed embodiment, fifth bore portion 44 is of a fifth predetermined diameter and extends a fifth predetermined distance into said male or inner body 14 from one end of a second portion 50 thereof. Fifth bore portion 44 is coaxial with said fourth bore portion 42 but is larger in diameter and shorter in length than said fourth bore portion 42. The surfaces of adjacent ends of fourth and fifth bore portions 42 and 44 are connected by fourth beveled surface 52. Fifth beveled surface 54 is positioned at the inlet end of fourth bore portion 42 while sixth beveled surface 56 is positioned at the outlet end of fifth bore portion 44. The wall surface of fifth bore portion 44 is threaded as shown at threads 46. In the disclosed embodiment, two versions have been made for the car wash operations with threads 46 being either ¼ inch NPT pipe thread or ⅜ inch NPT pipe thread. Threads 46 are not limited to these two configurations.

The outer surface, periphery or extremity of first portion 48 is provided with four separate annular cavities, grooves, or recesses as at first annular cavity, groove or recess 56 located at the first or inlet end of first portion 48. Inboard from first annular groove 56, a predetermined distance, is a second annular cavity, groove or recess 58. Inboard from second annular groove 58, a predetermined distance, is a third annular cavity, groove or recess 60. In the disclosed embodiment, second annular groove 58 and third annular groove 60 are the same or similar in dimensions. Inboard of third annular groove 60, a predetermined distance, is a fourth annular cavity, groove or recess 62. The outer surface of one end of the second portion 50 is provided with wrench-engageable portions 64 illustrated in the present drawing as being of the conventional hexagonal form.

A coupling means in the form of a coupling or retaining nut 66 cooperates with female or outer body 12 and male or inner body 14 to draw and maintain the two bodies 12 and 14 together in an operative relationship. Coupling or retaining nut 66 has a bore or passage 68 formed axially therein which extends entirely therethrough. Bore or passage 68 comprises two bore portions as at sixth bore portion 70 and seventh bore portion 72. In the disclosed embodiment, sixth bore portion 70 is of a sixth predetermined diameter and extends a sixth predetermined distance into said coupling or retaining nut 66 from an end of a first portion 71 thereof. In the disclosed embodiment, seventh bore portion 72 is of a seventh predetermined diameter and extends a seventh predetermined distance into said coupling or retaining nut 66 from an end of a second portion 74 thereof. Seventh bore portion 72 is coaxial with sixth bore portion 70 but is smaller in diameter and shorter in length than sixth bore portion 70. The wall surface of sixth bore portion 70 is threaded as shown at threads 76. Threads 76 are configured to mate with and operatively cooperate with threads 36 found on the outer surface of second portion 26 of female or outer body 12. The outer surface of both first portion 71 and second portion 74 is provided with wrench-engageable portions 78 illustrated in the present drawing as being of the conventional hexagonal form.

The various elements comprising the swivel connector apparatus 10 are assembled together to provide a functional connector by starting with the male or inner body 14. Coupling or retaining nut 66 is slipped over first portion 48 such that seventh bore portion 72 rests in a surrounding relationship with respect to shoulder 80 of male or inner body 14 and first portion 71 is directed toward the inlet end of male or inner body 14. The next element to be assembled on the male or inner body 14 is the one-piece radial and axial bearing 82 which is generally circular in shape with a central opening 84 therein. As depicted in FIG. 2, the radial and axial bearing 82, in cross section, comprises an essentially square main portion 86 with a leg or extension 88 protruding from the center of one side of the main portion 86 to form a generally T-shape. The radial and axial bearing 82 is slipped over first portion 48, and shoulder 80. Flat washer 90 is slipped over first portion 48 and is positioned against the radial and axial bearing 82. True-arc ring 92 is then expanded, slipped over first portion 48 until positioned over fourth annular cavity 62 and is then released whereupon ring 92 is spring-locked into position in cavity 62. True-arc ring 92 maintains coupling or retaining nut 66, radial and axial bearing 82 and washer 90 in position on male inner body 14 as depicted in FIG. 2 while allowing coupling or retaining nut 66 to rotate relative to first portion 48 and second portion 50. Flat washer 90 functions to reinforce or back-up the radial and axial bearing 82 and to transmit the axial load to the true-arc ring 92. First O-ring 94 is forced over first portion 48 and is positioned in third annular cavity 60 while second O-ring 96 is forced over first portion 48 and is positioned in second annular cavity 58. Front radial bearing 98 is forced over first portion 48 and positioned in first annular cavity 56. First portion 48, with the installed elements thereon, is telescoped into and journaled in second and third bore portions 20 and 22, respectively of female or outer body 12 until threads 76 of coupling or retaining nut 66 operatively contact threads 36 of female or outer body 12. With threads 36 and 76 in operative contact, then coupling or retaining nut 66 may be rotated such that nut 66 is completely tightened upon female body 12 to maintain female body 12 and male body 14 in operative relationship whereby female body 12 and male body 14 are capable of relative rotational movement around their common axis.

With reference to FIG. 4, swivel connector apparatus 10 is depicted in an exemplary installation in a stall at a car wash operation. Inlet pipe 100 is attached to the overhead 102 by attachment means 104 and connects between a pressurized water supply and one end of elbow 106. First portion 24 of female body 12 of a first swivel connector 10 is threadably attached to the other end of the elbow 106 by threads 32. Nipple 108 connects one end of elbow 110 to second portion 50 of male body 14. The other end of elbow 110 is connected to one end of elbow 114 by pipe or boom 112. A second swivel connector 10 is attached between the other end of elbow 114 and rubber hose 116. A wand (not shown) is connected to the other end of rubber hose 116 and is held and used by the individual to wash the care positioned in the car wash stall. Two functional applications are shown in FIG. 4 for the swivel connector 10 with the first being a right angle application and the second being an in-line application although it is appreciated that both swivel connectors 10 are in the line. The first swivel connector 10 allows pipe or boom 112 to rotate on a plane parallel to inlet pipe 100 whereby hose 116 is positionable at points around the perimeter of the car. The second swivel connector 10, connected to elbow 114, allows hose 116 to rotate with respect to the outlet opening of elbow 114 thereby preventing the hose 116 from getting twists, tangles or kinks in the hose during the washing operation and movement around the car.

With further reference to FIG. 2, the liquid, whether it be water or a mixture of detergent and water or wax and water, flows into the swivel connector apparatus 10 through first bore portion 18 at the first portion 24 of female body 12, then into a portion of second bore portion 20, then into fourth bore portion 42, then into a portion of fifth bore portion 44 and out of the swivel connector apparatus 10 at the end of second portion of male body 14. First and second O-rings 94 and 96 respectively, are formed preferably from nitrile or Buna N compound of 90 durometer and provide a means for sealing the space between the outside surface of first portion 48 and the inside surface of second bore portion 20. Front radial bearing 98 is formed from a teflon impregnated plastic commonly known as Delrin AF. Front radial bearing 98, in cooperation with radial and axial bearing 82, maintains the first portion 48, and of course the installed O-rings 94 and 96, concentric with respect to the second and third bore portions 20 and 22 which allows the O-rings 94 and 96 to provide and perform a more reliable sealing function for a longer period of time without damage to the O-rings which would occur if the O-rings 94 and 96 were subjected to radial loading. Radial and axial bearing 82 is also formed from a teflon impregnated plastic commonly known as Delrin AF. In addition to its radial load function, radial and axial bearing 82 is subjected to the axial load, which is the largest load, which is caused by the pressurized fluid which attempts to separate the female body 12 and the male body 14. The radial force is applied to and carried by leg or extension 88 as well as by the surface of opening 84 and the outer surface 118 of the square main portion 86 of the radial and axial bearing 82. The axial thrust force is applied to and carried by surface 120, against flat washer 90, surface 122 against the side of shoulder 80 and surface 124 against the side of shoulder 80 and surface 124 against second portion 74 of retaining nut 66.

Because of the particular design which includes a minimum number of parts, the dimension tolerances allowed with regard to the surfaces of the radial and axial bearing 82, front radial bearing 98 and the true-arc ring 92 together with all the surface dimensions of the swivel connector apparatus 10 which are in contact with the three elements set forth above as well as the surface dimensions in contact with first O-ring 94 and O-ring 96 are very critical and must be held within a tolerance of 0.002 inches in order for the apparatus 10 to perform properly and have the length of reliable service for which the apparatus is designed. For example, if the depth of fourth annular cavity 62, in which the true-arc ring 92 is positioned, was allowed to be too deep or too shallow, then the ring 92 would be allowed to rotate and cause wear or cavity 62 would not contain enough shoulder for gripping purposes and the swivel connector 10 would blow apart under pressure.

The present invention eliminates the corrosion and/or rusting problems since the female body 12, the male body 14 and the coupling or retaining nut 66 are formed preferably from brass. O-rings 94 and 96 prevent any fluid from reaching flat washer 90 or true-arc ring 92. During the assembly of the swivel connector apparatus 10, grease is applied around the flat washer 90 and true-arc ring 92 to further eliminate any corrosion or rust problem in the rare event that any fluid did travel past O-rings 94 and 96. Normally, the bearings 82 and 98 and the retaining means need not be serviced for the life of the swivel connector 10. When the O-rings 94 and 96 need to be replaced, it is not necessary to disconnect the swivel connector from the attached inlet and outlet lines to separate the female body 12 and the male body 14. It is only necessary to rotate the coupling or retaining nut 66 to a point where bodies 12 and 14 may be separated.

Thus, it is apparent that there has been provided in accordance with this invention, swivel connector apparatus that substantially incorporates the advantages set forth above. The complicated elements of the apparatus have been designed such that the servicing thereof is minimal and the elements which require the most servicing are easily serviceable. Although the present invention has been described in conjunction with specific forms thereof, it is evident that many alternatives, modifications, and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiments. Various changes may be made in the shape, size and arrangements of parts. For example, equivalent elements may be substituted for those illustrated and described herein, parts may be reversed, and certain features of the invention may be utilized independently of features of the invention. It will be appreciated that the various modifications, alternatives, variations, etc., may be made without departing from the spirit and scope of the invention as defined in appended claims.

We claim:

1. Swivel connector apparatus for connecting lines conveying pressurized fluids therein and providing the capability for one line to move with respect to the other line, said apparatus comprising:

a female body including a first portion having an inlet end and a second portion having an exit end, said inlet end being adapted to be connected to a first fluid line, said female body further including a bore extending axially therethrough from said inlet end to said exit end, said bore including a first bore portion, a second bore portion and a third bore portion positioned in axially spaced relationship starting from said inlet end, said bore portions being of different diameter;

a male body including a first portion having an inlet end and a second portion having an exit end, said exit end being adapted to be connected to a second fluid line, said male body further including a bore extending axially therethrough from said inlet end to said exit end, said first portion adapted for an interfitting relationship within said second and said third bore portions of said female body and in radial spaced relation thereto, said first portion including a first annular cavity, a second annular cavity, a third annular cavity, a fourth annular cavity and a circumferential shoulder positioned in axially spaced relationship starting from said inlet end;

first bearing means operatively positioned in said first annular cavity and capable of engagement with said second bore portion of said female body;

first sealing means operatively positioned in said second annular cavity and capable of engagement with said second bore portion of said female body;

second sealing means operatively positioned in said third annular cavity and capable of engagement with said second bore portion of said female body;

second bearing means positioned in operative engagement with said circumferential shoulder and capable of engagement with said third bore portion of said female body;

retaining means to rotatably connect said female body and said male body to each other and disposed between the outer surface of said second portion of said female body and said second bearing means; and locking means operatively positioned in said fourth annular cavity and capable of maintaining said second bearing means in operative engagement with said circumferential shoulder and with said retaining means while permitting relative rotational movement between said female body and said male body.

2. The apparatus of claim 1 wherein said first bearing means comprises a one-piece radial bearing.

3. The apparatus of claim 2 wherein said one-piece radial bearing is ring-like in shape.

4. The apparatus of claim 3 wherein said one-piece radial bearing is formed from a teflon impregnated plastic.

5. The apparatus of claim 1 wherein said second bearing means comprises a one-piece radial and axial bearing.

6. The apparatus of claim 5 wherein said one-piece radial and axial bearing comprises, in cross section, a generally square main portion having a leg protruding from the center of a predetermined side of said generally square main portion to form a generally T-shape in cross section, said generally square main portion being positioned between said first portion of said male body and said third bore portion of said female body, said leg being positioned to be capable of engagement with said circumferential shoulder and said retaining means.

7. The apparatus of claim 6 wherein said one-piece radial and axial bearing is formed from a teflon impregnated plastic.

8. The apparatus of claim 1 wherein said locking means comprises a true-arc ring.

9. The apparatus of claim 8 wherein said locking means further comprises a flat washer positioned between said one-piece radial and axial bearing and said true-arc ring.

10. The apparatus of claim 1 wherein said first sealing means comprises an O-ring.

11. The apparatus of claim 10 wherein said O-ring is formed from a nitrile compound of 90 durometer.

12. The apparatus of claim 1 wherein said second sealing means comprises an O-ring.

13. The apparatus of claim 12 wherein said O-ring is formed from a nitrile compound of 90 durometer.

14. The apparatus of claim 1 wherein said second bore portion of said female body is larger in diameter than said first bore portion and said third bore portion is larger in diameter than said second bore portion.

15. The apparatus of claim 1 wherein said female body comprises a one-piece body.

16. The apparatus of claim 1 wherein said male body comprises a one-piece body.

17. The apparatus of claim 1 wherein said male body is provided with wrench engageable surfaces formed at a predetermined location on the exterior surface of said second portion thereof.

18. The apparatus of claim 1 wherein said female body is provided with wrench engageable surfaces formed at a predetermined location on the exterior surface of said first portion thereof.

19. The apparatus of claim 1 wherein said retaining means threadably engages said second portion of said female body.

20. The apparatus of claim 19 wherein said retaining means is provided with wrench engageable surfaces at a predetermined location on the exterior surface thereof.

21. Apparatus for washing a vehicle by an individual while the vehicle is positioned in an appropriate area, said apparatus comprising:
 a water supply means capable of providing a supply of pressurized water to said appropriate area;
 a stationary line connected to said water supply means and extending to said appropriate area to transport said water;
 a movable line positioned in a predetermined plane; and
 a first swivel connector apparatus operatively connected between said stationary line and said movable line whereby said movable line may rotate in said predetermined plane, said first swivel connector comprising a female body including a first portion having an inlet end and a second portion having an exit end, said inlet end being adapted to be connected to a first fluid line, said female body further including a bore extending axially therethrough from said inlet end to said exit end, said bore including a first bore portion, a second bore portion and a third bore portion positioned in axially spaced relationship starting from said inlet end, said bore portions being of different diameter;
 a male body including a first portion having an inlet end and a second portion having an exit end, said exit end being adapted to be connected to a second fluid line, said male body further including a bore extending axially therethrough from said inlet end to said exit end, said first portion adapted for an interfitting relationship within said second and said third bore portions of said female body and in radial spaced relation thereto, said first portion including a first annular cavity, a second annular cavity, a third annular cavity, a fourth annular cavity and a circumferential shoulder positioned in axially spaced relationship starting from said inlet end;
 first bearing means operatively positioned in said first annular cavity and capable of engagement with said second bore portion of said female body;
 first sealing means operatively positioned in said second annular cavity and capable of engagement with said second bore portion of said female body;
 second sealing means operatively positioned in said third annular cavity and capable of engagement with said second bore portion of said female body;
 second bearing means positioned in operative engagement with said circumferential shoulder and capable of engagement with said third bore portion of said female body;
 retaining means to rotatably connect said female body and said male body to each other and disposed between the outer surface of said second portion of said female body and said second bearing means; and
 locking means operatively positioned in said fourth annular cavity and capable of maintaining said second bearing means in operative engagement with said circumferential shoulder and with said retaining means while permitting relative rotational movement between said female body and said male body.

22. The apparatus of claim 21 further including a flexible hose to which a wand may be operatively connected and which may be used by said individual to control the flow of water during the washing of the vehicle and a second swivel connector apparatus operatively positioned between said flexible hose and said movable line.

* * * * *